(12) United States Patent
Malek-Mohammadi et al.

(10) Patent No.: US 12,192,758 B2
(45) Date of Patent: Jan. 7, 2025

(54) NETWORK ENTITIES, METHODS, APPARATUSES AND COMMUNICATIONS NETWORKS FOR AUTHENTICATING AN EVENT

(71) Applicant: Telefonaktiebolaget LM Ericsson (PUBL), Stockholm (SE)

(72) Inventors: Mohammadreza Malek-Mohammadi, Solna (SE); Amin Azari, Järfälla (SE); Cicek Cavdar, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 435 days.

(21) Appl. No.: 17/605,480

(22) PCT Filed: Apr. 23, 2019

(86) PCT No.: PCT/SE2019/050368
§ 371 (c)(1),
(2) Date: Oct. 21, 2021

(87) PCT Pub. No.: WO2020/218954
PCT Pub. Date: Oct. 29, 2020

(65) Prior Publication Data
US 2022/0225092 A1 Jul. 14, 2022

(51) Int. Cl.
*H04W 12/06* (2021.01)
*H03K 23/54* (2006.01)
(Continued)

(52) U.S. Cl.
CPC ............ *H04W 12/06* (2013.01); *H03K 23/54* (2013.01); *H04W 12/122* (2021.01); *H04W 52/0229* (2013.01)

(58) Field of Classification Search
CPC ............... H04W 12/06; H04W 12/122; H04W 52/0229; H04W 12/069; H03K 23/54; H04L 63/123; H04L 63/08
See application file for complete search history.

(56) References Cited

U.S. PATENT DOCUMENTS

| | | | |
|---|---|---|---|
| 2002/0057748 A1* | 5/2002 | Rick | H04L 1/0054 714/795 |
| 2007/0174374 A1* | 7/2007 | Inoha | G06F 7/584 708/252 |

(Continued)

FOREIGN PATENT DOCUMENTS

| | | | | |
|---|---|---|---|---|
| CN | 102438301 A | | 5/2012 | |
| CN | 102625423 A | * | 8/2012 | ........ H04W 52/0229 |

(Continued)

OTHER PUBLICATIONS

Elena Dubrova et al., A BDD-Based Approach to Constructing LFSRs for Parallel CRC Encoding, 2012 IEEE 42nd International Symposium on Multiple-Valued Logic—2012.

(Continued)

*Primary Examiner* — Trong H Nguyen
(74) *Attorney, Agent, or Firm* — Baker Botts L.L.P.

(57) ABSTRACT

A method performed by a first network entity (121, 131) for authenticating an event in a communications network (101, 102, 103, 104) is provided. The first network entity (121, 131) is configured to receive an event signal. The first network entity (121, 131) is also configured to authenticate the event if the received event signal correlates with an 5 output signal of a closed-loop shift register in the first network entity (121,131). Furthermore, the first network entity (121, 131) is configured to trigger a change in the closed-loop shift register in order to obtain a subsequent output signal from the closed-loop shift register. A first network entity (121, 131) for authenticating an event is also (Continued)

provided. Further, a wake-up receiver circuit (1210) comprising the first network entity 10 (121, 131) is provided, as well as, a wireless device (1200) comprising the wake-up receiver circuit (1210). Furthermore, a second network entity (110, 111, 112, 113) and a method therein for authenticating an event in at least one first network entity (121, 131) in a communications network (101, 102, 103, 104) are also provided. Also, a radio base station comprising the second network entity (110, 111, 112, 113) is provided, as well as, 15 computer programs and communications networks.

18 Claims, 11 Drawing Sheets

(51) Int. Cl.
*H04W 12/122* (2021.01)
*H04W 52/02* (2009.01)

(56) References Cited

U.S. PATENT DOCUMENTS

| | | | |
|---|---|---|---|
| 2010/0289780 A1 | 11/2010 | Chang et al. | |
| 2016/0057703 A1 | 2/2016 | Benoit et al. | |
| 2017/0141918 A1* | 5/2017 | Dubrova | H04L 9/3242 |
| 2018/0018185 A1* | 1/2018 | Sun | G06F 21/44 |
| 2018/0063788 A1 | 3/2018 | Yang et al. | |
| 2018/0324701 A1* | 11/2018 | Sun | H04W 4/06 |
| 2021/0297177 A1* | 9/2021 | Fujiki | H04L 5/0053 |

FOREIGN PATENT DOCUMENTS

| | | | | |
|---|---|---|---|---|
| EP | 1192752 A1 * | 4/2002 | | H04L 9/3242 |
| EP | 1 192 752 B1 | 1/2006 | | |
| WO | WO-2018237180 A1 * | 12/2018 | | H04L 63/0846 |

OTHER PUBLICATIONS

Michele Magno et al., Design, Implementation, and Performance Evaluation of a Flexible Low-Latency Nanowatt Wake-Up Radio Receiver, IEEE Transactions on Industrial Informatics, vol. 12, No. 2—Apr. 2016.
Hala Khodr et al., Energy Efficient IoT Sensor with RF Wake-Up and Addressing Capability, IEEE Sensors Letters, vol. 1, No. 6—Dec. 2017.
Yang Yu, Evaluation of Cryptographic CRC in 65nm CMOS, Degree Project in Information and Communication Technology, Second Cycle, 30 Credits, Stockholm, Sweden—2017.
Faycal Ait Aoudia et al., Leveraging Energy Harvesting and Wake-Up Receivers for Long-Term Wireless Sensor Networks, Sensors 2018, www.mdpi.com/journal/sensors—2018.
Pilar Andres-Maldonado et al., Narrowband IoT Data Transmission Procedures for Massive Machine-Type Communications, Research Center for Information and Communications Technologies, University of Granada, IEEE Network—Nov./Dec. 2017.
PCT International Search Report issued for International application No. PCT/SE2019/050368—Dec. 19, 2019.
Rajeev Piyare et al., Ultra Low Power Wake-Up Radios: A Hardware and Networking Survey, IEEE Communications Surveys &Tutorials, vol. 19, No. 4, Fourth Quarter—2017.
Sadok Bdiri et al., An 868 MHz 7.5 µW wake-up receiver with—60 dBm sensitivity, JSSS Journal of Sensors and Sensor System—Dec. 22, 2016.
PCT Written Opinion of the International Searching Authority issued for International application No. PCT/SE2019/050368—Dec. 19, 2019.

* cited by examiner

NETWORK ENTITIES, METHODS, APPARATUSES AND COMMUNICATIONS NETWORKS FOR AUTHENTICATING AN EVENT

PRIORITY

This nonprovisional application is a U.S. National Stage Filing under 35 U.S.C. § 371 of International Patent Application Serial No. PCT/SE2019/050368 filed Apr. 23, 2019 and entitled "NETWORK ENTITIES, METHODS, APPARATUSES AND COMMUNICATIONS NETWORKS FOR AUTHENTICATING AN EVENT", which is hereby incorporated by reference in its entirety.

TECHNICAL FIELD

Embodiments herein relate to authentication of events in a network entity. In particular, embodiments herein relate to a first network entity and method therein for authenticating an event. Also, embodiments herein relate to a second network entity and a method therein for authenticating an event in at least one first network entity. Further, embodiments herein also relate to a wake-up receiver circuit, a wireless device, a radio base station, and communications networks.

BACKGROUND

In many different communications networks, there is an increasing need to be able to provide a secure authentication of an event prior to performing the event in a network entity. Today, unauthorized invocations of events are namely often a part of attacks or hacking attempts in communications networks, and therefore it is important to ensure that any such unauthorized invocations of events are prevented. One example of such unauthorized invocations of events are invocations performed as part of battery lifetime attacks in wireless communications networks. In such battery lifetime attacks, it is common for an eavesdropper to listen to the radio channel, discover the pattern used in activating a network entity in the wireless communications network, and then activate the network entity repetitively in order to deplete the battery of the network entity. Another example of such unauthorized invocations of events are invocations repetitively performed towards a network entity in a communications network in order to overload the network entity or block the network entity from performing different tasks.

However, secure authentication of an event in a communications network today often requires extra message exchanges, such as, e.g. exchanges of signatures or keys, between the network entity requesting the event to be performed and the network entity performing the event. This may lead to additional data traffic in the communications network, complex computations, and power consuming activities needed to be performed at each network entity, and hence may not be considered particularly energy-efficient. The latter is also a real concern in wireless communications networks comprising network entities with limited power capabilities.

SUMMARY

It is an object of embodiments herein to enable a secure and energy-efficient event handling in a communications network.

According to a first aspect of embodiments herein, the object is achieved by a method performed by a first network entity for authenticating an event. The first network entity receives an event signal. Also, the first network entity authenticates the event if the received event signal correlates with an output signal of a closed-loop shift register in the first network entity. Further, the first network entity triggers a change in the closed-loop shift register in order to obtain a subsequent output signal from the closed-loop shift register.

According to a second aspect of embodiments herein, the object is achieved by a first network entity for authenticating an event. The first network entity is configured to receive an event signal. The first network entity is also configured to authenticate the event if the received event signal correlates with an output signal of a closed-loop shift register in the first network entity. Furthermore, the first network entity is configured to trigger a change in the closed-loop shift register in order to obtain a subsequent output signal from the closed-loop shift register.

According to a third aspect of embodiments herein, the object is achieved by a wake-up receiver circuit comprising a first network entity as described above. According to a fourth aspect of embodiments herein, the object is achieved by a wireless device for use in a wireless communications network comprising a wake-up receiver circuit as described above.

According to a fifth aspect of embodiments herein, the object is achieved by a method performed by a second network entity for authenticating an event in at least one first network entity. The second network entity generates an event signal to be used in authenticating the event in the at least one first network entity using the output of at least one closed-loop shift register. Also, the second network entity transmits the generated event signal to the at least one first network entity. Further, the second network entity triggers a change in the at least one closed-loop shift register in order to obtain a subsequent output signal from the at least one closed-loop shift register.

According to a sixth aspect of embodiments herein, the object is achieved by a second network entity for authenticating an event in at least one first network entity. The second network entity is configured to generate an event signal to be used in authenticating the event in the at least one first network entity using the output of at least one closed-loop shift register. The second network entity is also configured to transmit the generated event signal to the at least one first network entity. The second network entity is further configured to trigger a change in the at least one closed-loop shift register in order to obtain a subsequent output signal from the at least one closed-loop shift register.

According to a seventh aspect of embodiments herein, the object is achieved by a radio base station for use in a wireless communications network comprising a second network entity as described above.

According to an eight aspect of the embodiments herein, computer programs are also provided that is configured to perform the methods described above. Further, according to a ninth aspect of the embodiments herein, carriers are also provided that are configured to carry the computer program configured for performing the methods described above.

According to a tenth aspect of embodiments herein, the object is achieved by a wireless communications network comprising a wireless device and/or a radio base station as described above. According to an eleventh aspect of embodiments herein, the object is achieved by a communications network comprising a first network entity and/or a second network entity as described above.

By correlating with an output signal of a closed-loop shift register, a first network entity in a communications network is able to authenticate whether a received event signal has been validly generated by a corresponding closed-loop shift register in a second network entity in the communication network or not. Since there is no need for any other message exchange, except the event signal between the first and second network entities, this advantageously provides an energy-efficient event handling in the first network entity. In addition, the use of shift registers also reduces the complexity and power consumption in the first and second network entity for the event handling, since they may be designed and implemented using simple circuit solutions. Lastly, since the closed-loop shift register at the first network entity and the closed-loop shift register at the second network entity is changed for each event signal transmission, once a potential eavesdropper captures the event signal for a battery lifetime attack, the event signal has been successfully used for an authentication and has thus already been changed. Hence, a secure event handling is provided as well.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
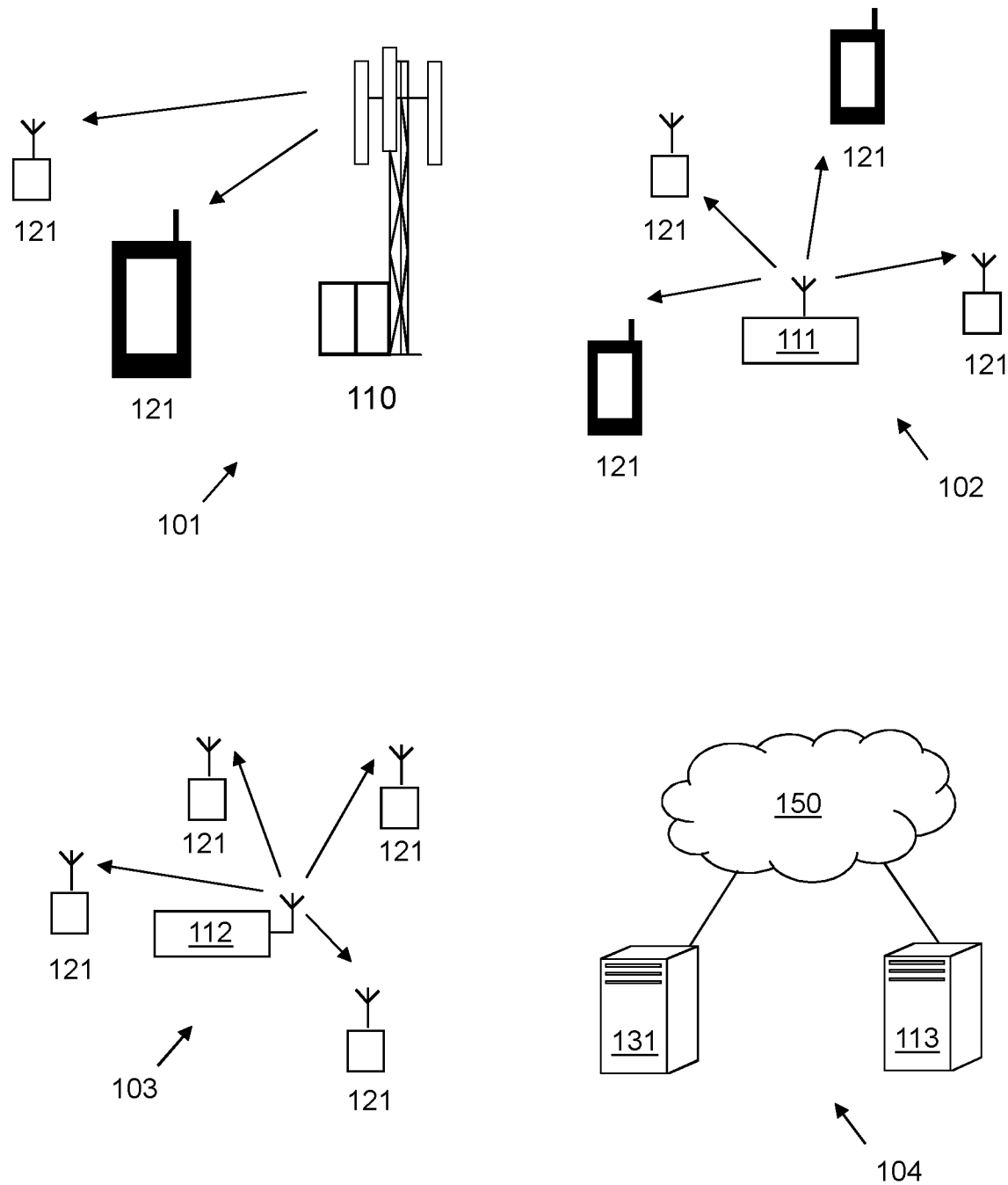
FIG. 1 is a schematic illustration of different communications networks according to some embodiments.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts examples communication networks 101, 102, 103, 104 in which embodiments herein may be implemented.

The communication network 101 is an example of a wireless, cellular, mobile or radio communication network or system, such as, for example, a Long Term Evolution (LTE) network, any $3^{rd}$ Generation Partnership Project (3GPP) cellular network, Worldwide interoperability for Microwave Access (Wimax) network, a Fourth Generation (4G) or LTE advanced network, a Fifth Generation (5G) or New Radio (NR) network etc. The wireless communication network 100 may comprise one or more of radio network nodes, wherein one radio network node 110 is depicted in the example of FIG. 1. The radio network node 110 may also be referred to as a network access node or a radio base station, and may, for example, be any one of an eNB, a gNB, an eNodeB, a gNodeB, a Home NodeB, a Home eNodeB, or a Home gNodeB, etc. The radio network node 110 may be operative or adapted to serve one or more wireless devices 121 located within its radio coverage or cell. The wireless devices 121 may here be any type of wireless devices or user equipments, UEs, able to communicate with the radio network node 110 in the wireless communications network 101. Examples of such wireless devices are any type of IoT enabled devices, IoT sensors, mobile phones, cellular phones, Personal Digital Assistants (PDAs), smart phones, tablets, sensors equipped with a UE, Laptop Mounted Equipments (LME) (e.g. USB), Laptop Embedded Equipments (LEEs), Machine Type Communication (MTC) devices, or Machine to Machine (M2M) devices, Customer Premises Equipment (CPE), device-to-device (D2D) wireless devices, wireless devices capable of machine to machine (M2M) communication, etc.

The communication network 102 is another example of a wireless communications network, such as, for example, a Wireless Local Area Network, WLAN, or Wi-Fi network. The communication network 102 may comprise one or more local access points, wherein one local access point 111 is depicted in the example of FIG. 1. The local access point 111 may be operative or adapted to serve one or more of the wireless devices 121 located within its coverage range.

The communication network 103 is yet another example of a wireless communications network, such as, a Wide or Local Area IoT Network, e.g. a Narrowband IoT, NB-IoT, network. The communication network 102 may comprise one or more local access points, wherein one local access point 112 is depicted in the example of FIG. 1. The local access point 112 may be operative or adapted to serve one or more of the wireless devices 121 located within its coverage range.

The communication network 104 is an example of a communications network wherein a first network node 131 and a second network node 113 are connected and arranged to communicate with each other over a data network, such as, e.g. the Internet.

In the following, the wireless devices 121 and the first network node 131 in the communications networks 101, 102, 103, 104 are referred to as a first network entity 121, 131, while the radio network node 110, local access points 111, 112, and the second network node 113 are referred to as a second network entity 110, 111, 112, 113. Embodiments of the first network entity 121, 131, the second network entity 110, 111, 112, 113 and methods therein will be described in more detail below with reference to FIGS. 2-11. However, although embodiments below are described with reference to FIG. 1, this should not be construed as limiting to the embodiments herein, but merely as an example made for illustrative purposes.

As part of the developing of the embodiments described herein, it has been realized that shift registers, such as, the Linear Feedback Shift Registers, LFSRs, may be used for secure signature generation and event handling within different communications networks. Today, for example, LFSRs are most commonly used for generating random numbers that are employed in wireless communications networks, such as, random multiple-access codes in Code-Division Multiple Access, CDMA. But also, for example, in digital logic design for hardware testing.

Figure 2:
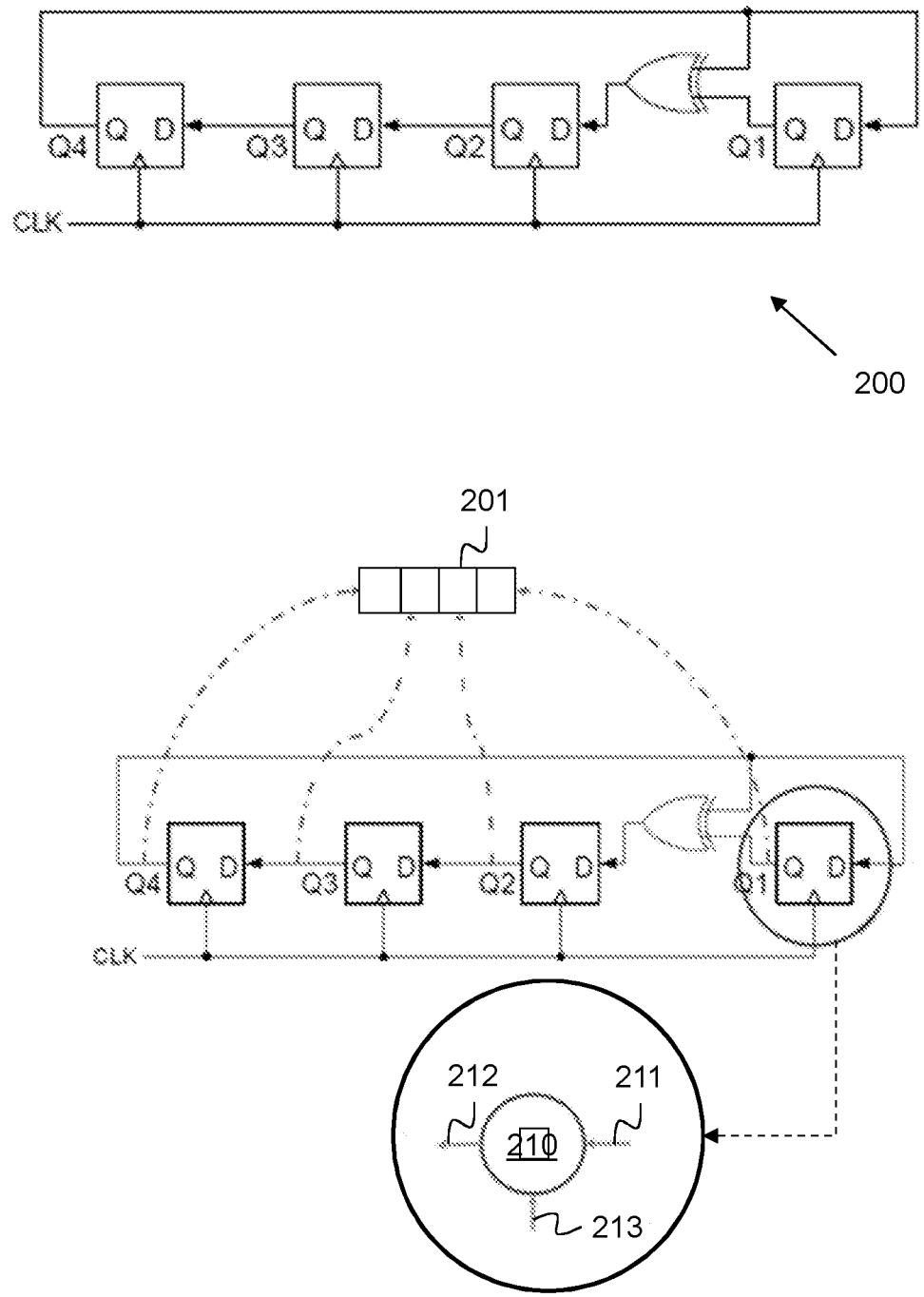
FIG. 2 is a schematic illustration of the operation of an exemplary 4-bit closed-loop shift register according to some embodiments.

FIG. 2 shows schematic illustrations of the operation of an example of a 4-bit closed-loop LFSR 200. The 4-bit closed-loop LFSR 200 comprises four interconnected or cascaded flip-flops that use the same clock, CLK. The data output pin of each flip-flop, denoted Q, is connected to the data input pin, denoted D, of the next flip-flop in the chain. This results in a circuit that shifts, by one position, the bit array or sequence [Q1, Q2, Q3, Q4] that is stored therein. As shown in the lower part of FIG. 2, each time the 4-bit closed-loop LFSR 200 is clocked, the output signal 201 from the interconnected or cascaded flip-flops forms a new bit array or sequence [Q1, Q2, Q3, Q4]. In other words, at each transition at the clock input pin, also referred to herein a clocking or triggering by a clock signal, the four interconnected or cascaded flip-flops "shifts in" the data that is present at its data input pin and "shifts out" the last bit in the bit array or sequence. Since this example shows a closed-loop LFSR, the last bit is thus returned to the data input pin of the first flip-flop, and in this particular example, may also be returned to the data input pin of the second flip-flop. Alternatively, each flip-flop may also be illustrated as a basic function 210 having a data input 211, a data output 212, and clock input 213.

The arrangement of the output signal obtained from the data output pins [Q1, Q2, Q3, Q4] in an LFSR may be expressed in finite field arithmetic as a polynomial. For example, if the outputs from the data output pins [Q1, Q2, Q4] are used, then the polynomial of the LFSR may be described as in Eq. 1:

$$1+x+x^4 \qquad (\text{Eq. 1})$$

It is known that an LFSR is of maximal-length if, and only if, its polynomial is primitive. This requires that the number of outputs used is even and that the set of outputs used is set-wise co-prime, i.e. there must be no divisor other than 1 common to outputs used. A feature of this type of LFSR is that the output signal 201 can only be determined by knowing the previous output signal of the LFSR and the primitive polynomial of the LFSR. Further, since each LFSR implement its own special primitive polynomial, the output signal of each LFSR to only a unique special input signal is an all-zero bit array or sequence. In other words, for every LFSR, there is one and only one input signal that can make the output of the LFSR equal to an all-zero bit array, vector or sequence. This is exemplified and demonstrated in FIG. 3.

Figure 3:
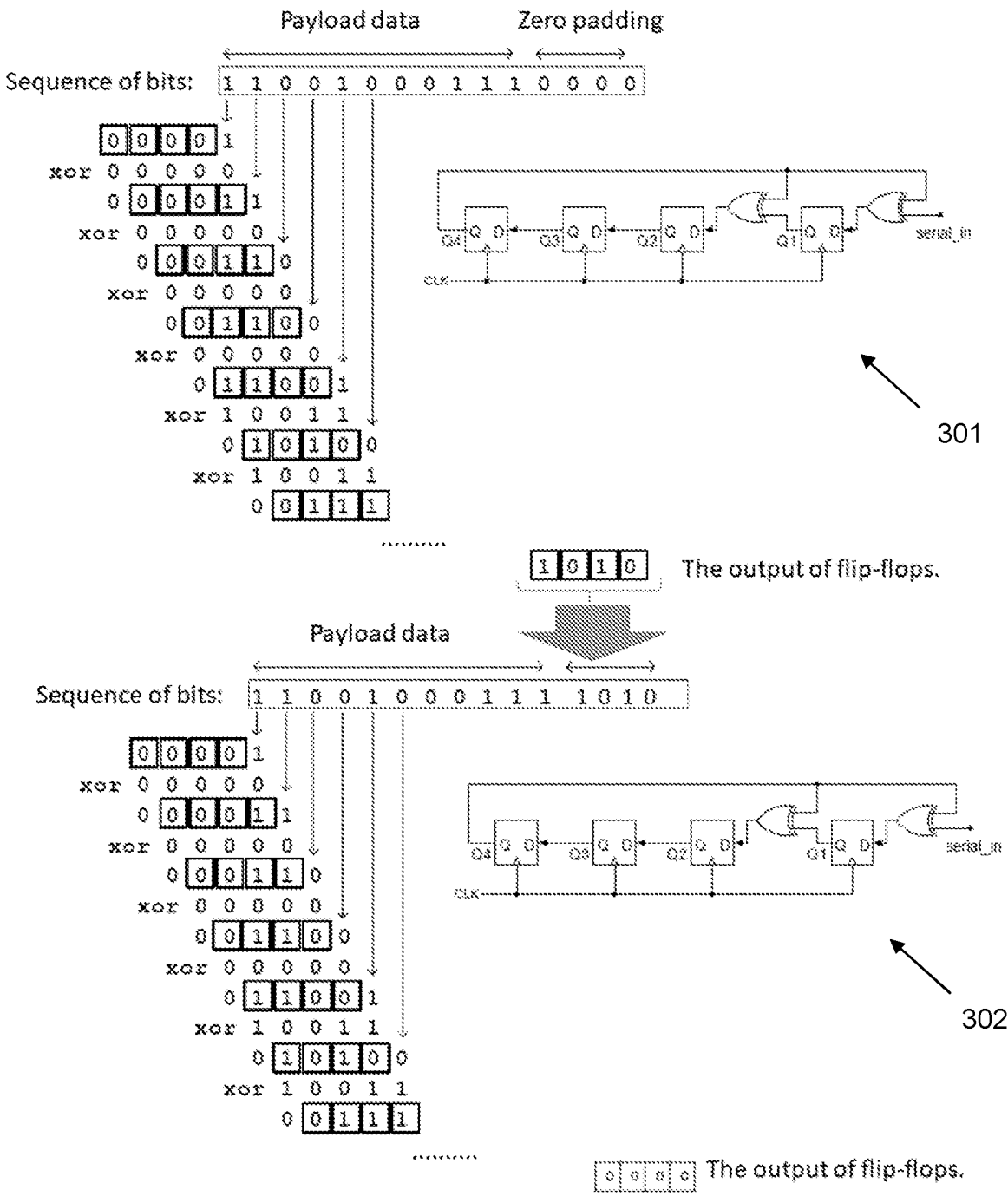
FIG. 3 is another schematic illustration of the operation of the exemplary 4-bit closed-loop shift register according to some embodiments.

In the example of FIG. 3, a 4-bit closed-loop LFSR 301 implementing the polynomial, $1+x+x^4$, is shown. An exemplary bit sequence [1100100011] representing a typical signal payload is fed into the 4-bit closed-loop LFSR 301 followed by a 4-bit sequence of all zeros, i.e. a zero-padded bit sequence. For this sequence of bits, the output from the flip-flops of the 4-bit closed-loop LFSR 301 will result in a [1010] bit sequence at the end. As depicted in the lower part of FIG. 3, if this [1010] bit sequence is added to the end of the same exemplary bit sequence [1100100011], i.e. instead of the 4-bits sequence of all zeros, this sequence of bits is inputted in an identical 4-bit closed-loop LFSR 302 also implementing the polynomial, $1+x+x^4$, the output of the 4-bit closed-loop LFSR 302 will result in a [0000] bit sequence at the end. Similarly, a 4-bit all-one bit sequence may be generated at the end of the output of the 4-bit closed-loop LFSR 302 by padding the exemplary bit sequence [1100100011] with [1111] at the end, storing the last 4-bit output when feeding this sequence of bits into the 4-bit closed-loop LFSR 301, and padding the exemplary bit sequence [1100100011] with this last 4-bit output before output when feeding this sequence of bits into the 4-bit closed-loop LFSR 302.

According to some embodiments herein, the above mentioned features of LFSRs may be utilized in order to provide a secure event signal or signature generation and event handling within a communications network. These embodiments are described in general by the combined flowchart and signalling in FIG. 4, and in more detail below with reference to FIGS. 5-12.

Figure 4:
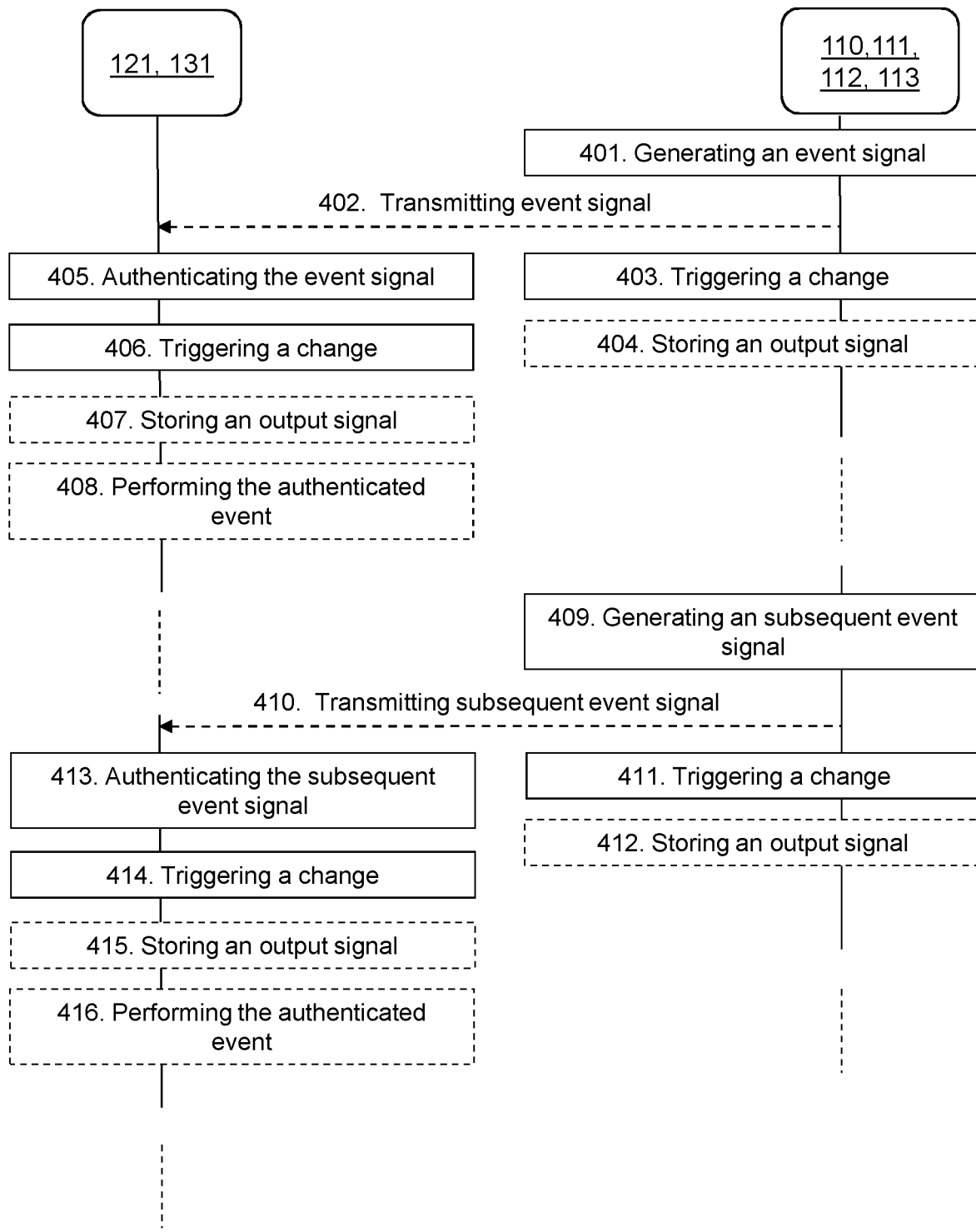
FIG. 4 is a combined flowchart and signalling scheme depicting embodiments of a method in a communications network.

FIG. 4 is a schematic combined flowchart and signalling in a communications network 101, 102, 103, 104 according to some embodiments. The communications network 101, 102, 103, 104 comprises at least one first network entity 121, 131, and a second network entity 110, 111, 112, 113.

Action 401. The second network entity 110, 111, 112, 113 generates an event signal to be used in authenticating the event in the at least one first network entity 121, 131 using the output of a closed-loop shift register in the second network entity 110, 111, 112, 113. This may be performed upon determining that an event is to be performed in the at least one first network entity 121, 131.

Action 402. The second network entity 110, 111, 112, 113 then transmits the generated event signal to the at least one first network entity 121, 131. Correspondingly, the event signal is received at the at least one first network entity 121, 131.

Action 403. The second network entity 110, 111, 112, 113 triggers a change in the closed-loop shift register in the second network entity 110, 111, 112, 113 in order to obtain a subsequent output signal from the closed-loop shift register in the second network entity 110, 111, 112, 113.

Action 404. Optionally, the second network entity 110, 111, 112, 113 may store the subsequent output signal from the closed-loop shift register in the second network entity 110, 111, 112, 113.

Action 405. The at least one first network entity 121, 131 authenticates the event if the received event signal correlates with an output signal of a closed-loop shift register in the at least one first network entity 121, 131.

Action 406. The at least one first network entity 121, 131 then triggers a change in the closed-loop shift register in the first network entity 121, 131 in order to obtain a subsequent output signal from the closed-loop shift register in the first network entity 121, 131.

Action 407. Optionally, the at least one first network entity 121, 131 may store the subsequent output signal from the at least one closed-loop shift register in the first network entity 121, 131.

Action 408. The at least one first network entity 121, 131 may then perform the authenticated event.

Action 409. After some period of time, the second network entity 110, 111, 112, 113 may determine that a subsequent event is to be performed in the at least one first network entity 121, 131. Then, the second network entity

110, 111, 112, 113 may generate a subsequent event signal using the stored output of the closed-loop shift register in the second network entity 110, 111, 112, 113.

Action 410. The second network entity 110, 111, 112, 113 then transmits the generated subsequent event signal to the at least one first network entity 121, 131. Correspondingly, the subsequent event signal is received at the at least one first network entity 121, 131.

Actions 411-412 correspond to Actions 403-404. Action 413. The at least one first network entity 121, 131 authenticates the subsequent event if the received subsequent event signal correlates with the stored output signal of the closed-loop shift register in the at least one first network entity 121, 131.

Actions 414-416 correspond to Actions 406-408.

One advantage of using shift registers in order to provide a secure signature generation and event handling within a communications network as described above, is that a secure addressing for the first network entity 121, 131 is achieved in the communications networks 101, 102, 103, 104 in which the event signal, or signature, cannot be discovered or used by an eavesdropper. This security feature enables the first network entity 121, 131 to, for example, to be immune to the battery lifetime attack in case the first network entity 121, 131 comprises a limited power battery, or being overloaded with unauthorised event signals.

Another advantage of using shift registers in order to provide a secure event signal or signature generation and event handling within a communications network as described above, is that it is energy efficient, both in terms of necessary transmissions and power consumption. In regard to the necessary transmissions, no other transmissions except the transmission of the event signal, or signature, is required, thus minimizing the number of transmissions in the communications network. In regard to the power consumption, a power analysis indicates that the power consumption at the first network entity 121, 131 according to some of the embodiments herein will be significantly less than comparable solutions on the market today.

Yet another advantage of using shift registers in order to provide a secure event signal or signature generation and event handling within a communications network as described above, is that it is highly scalable and may be used for addressing any number of first network entities 121, 131 in a communications network 101, 102, 103, 104, such as, billions of network entities. This is due to the fact that the shift registers themselves are easy to scale, and hence, a 128-bit LFSR for example may serve a massive amount of deployed network entities.

Although examples of embodiments herein are described using Linear Feedback Shift Registers, LFSRs, it should be noted that other shift registers may be implemented construed which may provide the same or similar function as LFSRs. Hence, the examples of embodiments herein using LFSRs should not be construed as limiting to the embodiments herein, but rather as a primary example.

Figure 5:
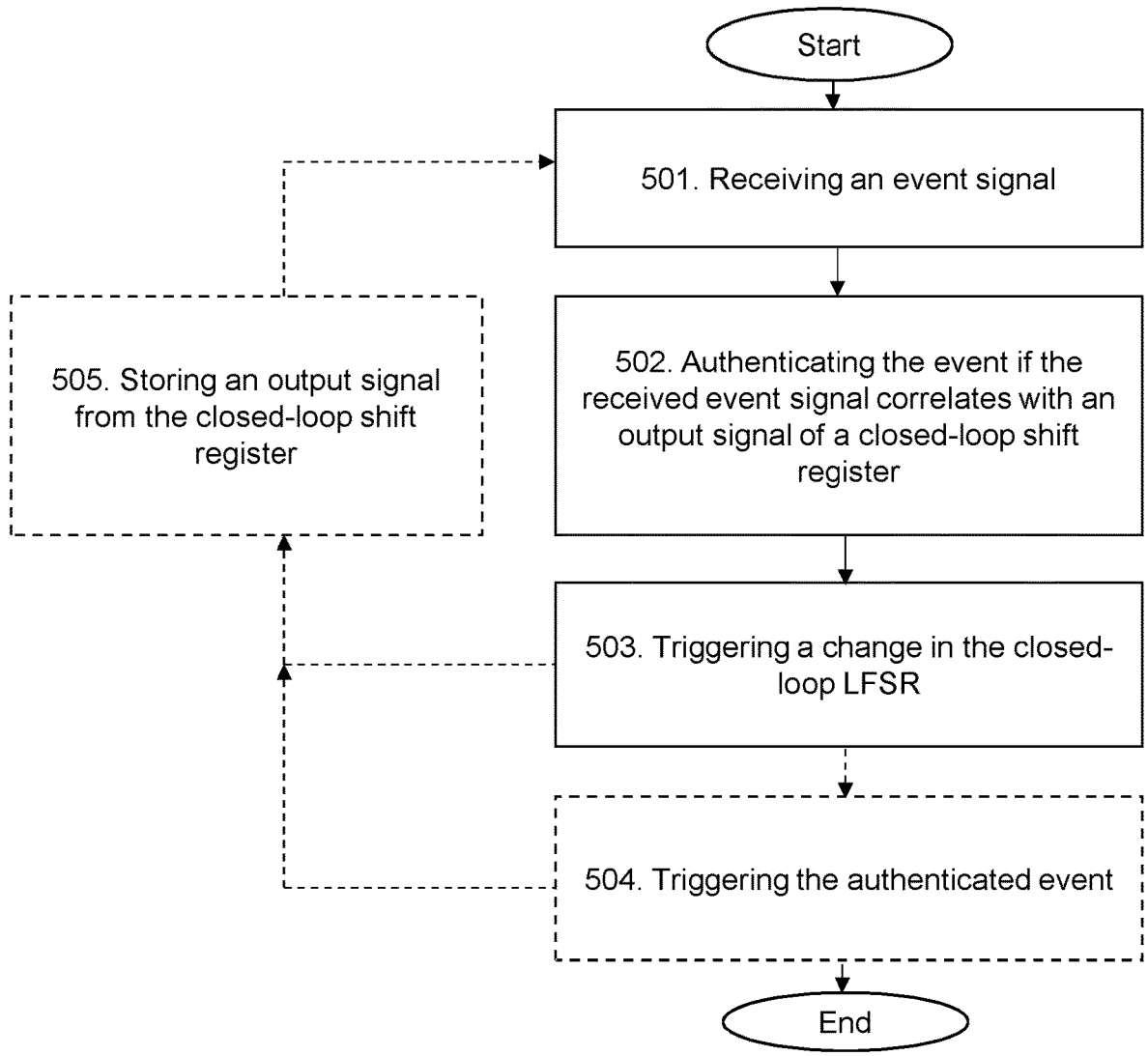
FIG. 5 is a flowchart depicting embodiments of a method in a first network entity.

Example of embodiments of a method performed by a first network entity 121, 131 for authenticating an event in a communications network 101, 102, 103, 104 will now be described with reference to the flowchart depicted in FIG. 5. FIG. 5 is an illustrative example of actions or operations which may be taken by the first network entity 121, 131 in the communications network 101, 102, 103, 104.

Action 501

The first network entity 121, 131 receives an event signal. The event signal may be generated by a closed-loop LFSR in a second network entity 110, 111, 112, 113 in a communications network 101, 102, 103, 104. The event signal may be transmitted to the first network entity 121, 131 from the second network entity 110, 111, 112, 113. The event signal may, for example, be a bit array or sequence, also referred herein as a signature or session key, which indicates to the first network entity 121, 131 that the first network entity 121, 131 is to perform a specific event. The event signal may be received as is, or may form part of another signal transmitted from the second network entity 110, 111, 112, 113 to the first network entity 121, 131 in the communications network 101, 102, 103, 104, e.g. as part of an Information Element, IE, in the control channel of a signal transmission in a wireless communications network.

One example of a specific event for which the event signal may be indicative is whether or not to activate the main circuit of the wireless device from a wake-up receiver circuit in the wireless device. This particular embodiment is described further below with reference to FIGS. 9-12. Another example of a specific event for which the event signal may be indicative is to authenticate the origin of a signal and/or any type of information payload comprised in a signal. This may, for example, be used for data encryption.

Action 502

After the reception of the event signal in Action 501, the first network entity 121, 131 authenticates the event if the received event signal correlates with an output signal of a closed-loop shift register in the first network entity 121, 131. This means, for example, that, due to the fact that the event signal is generated by a closed-loop LFSR at the second network entity 110, 111, 112, 113, a corresponding closed-loop LFSR at the first network entity 121, 131 may here advantageously be used to produce an output signal that in turn may be used to authenticate the received event signal. This means that if the received event signal correlates with the output signal, the event is authenticated and should be performed by the first network entity 121, 131. On the other hand, if the received event signal does not correlates with the output signal, the event is not authenticated and should not be performed by the first network entity 121, 131. It should also be noted that the output signal from the closed-loop LFSR may be obtained upon receiving the event signal or as a stored output signal of the first network entity 121, 131. Hence, both the first network entity 121, 131 and the second network entity 110, 111, 112, 113 will have the "next session key" without any need for packet exchange and handshaking, which results in a higher level of security and energy efficiency.

According to some embodiments, the primitive polynomial of the closed-loop shift register in the first network entity 121, 131 may be identical to the primitive polynomial of a corresponding closed-loop shift register in the second network entity 110, 111, 112, 113. This ensures an identical operation of the closed-loop LFSRs at both the transmitting side and receiving side, i.e. at both the first network entity 121, 131 and the second network entity 110, 111, 112, 113. Furthermore, in some embodiments, the initial state of the closed-loop shift register in the first network entity 121, 131 may be identical to the initial state of the corresponding closed-loop shift register in the second network entity 110, 111, 112, 113. This setting advantageously ensures that both closed-loop LFSRs are started with the same starting values, and thus produces an event signal at the second network entity 110, 111, 112, 113 that may be authenticated at the first network entity 121, 131 at all times.

Also, according to some embodiments, the output signal from the closed-loop shift register may be obtained by the first network entity 121, 131 from the output data, or output data pins, of logical flip-flops units in the closed-loop shift register. Here, it should be noted that the closed-loop LFSR and its logical flip-flops units may be implemented using hardware in the form of electrical circuit components, and/or as a computer program or software running in a microprocessor or similar. In the former case, the closed-loop LFSR may be implemented with programmable pins.

In some embodiments, the first network entity 121, 131 may correlate the received event signal with the output signal by comparing the received event signal directly with the output signal of a closed-loop LFSR in the first network entity 121, 131. In this case, if the received event signal is identical to the output signal, the event is authenticated and should be performed by the first network entity 121, 131. Otherwise, the event is not authenticated and should not be performed by the first network entity 121, 131.

Optionally, in some embodiments, the closed-loop LFSR in the first network entity 121, 131 may correlate the received event signal with the output signal by having the received event signal as an input signal. However, this presumes that the closed-loop LFSR in the second network entity 110, 111, 112, 113 uses a specific known input sequence, such as, e.g. an all-zero bit sequence, when generating the event signal, and that this specific known input sequence is known by the first network entity 121, 131. If so, the first network entity 121, 131 may use the received event signal as an input signal to the closed-loop LFSR, and compare the output signal of the closed-loop LFSR with the specific known input sequence. If the output signal of the closed-loop LFSR is identical to the specific known input sequence, e.g. an all-zero or all-one bit sequence, then the event is authenticated and should be performed by the first network entity 121, 131.

According to some embodiments, another option is that the received event signal correlates with the output signal of the closed-loop shift register if the received event signal causes a determined output signal when fed into an open-loop shift register that uses the output signal of the closed-loop shift register as its primitive polynomial. This means that the first network entity 121, 131 may comprise a second LFSR, namely an open-loop LFSR, to be used as a comparator. This open-loop LFSR may use the output signal of the closed-loop LFSR as its primitive polynomial, and the received event signal as input. Then, if the output signal of the open-loop LFSR corresponds to a determined output signal, such as, e.g. an all-zero or all-one bit sequence, then the event may be authenticated. These embodiments are described in more detailed below with reference to FIGS. 9-12. In this case, the first network entity 121, 131 may, if the determined output signal is an all-zero bit sequence, determine that the received event signal causes the determined output signal in case the number of zeros in the output signal of the open-loop shift register is less than a predetermined threshold. This provides more robust solution since the first network entity 121, 131 may tolerate occurrences of errors in the event signal that, for example, may occur due to transmission over a wireless communications network. More precisely, while the output of the open-loop LFSR in the first network entity 121, 131 should be all zero, or all ones, in order for the first network entity 121, 131 to authenticate the event, the first network entity 121, 131 may thus check the number of zeros, or ones, in the output signal of the open-loop LFSR, and in case the number of zeros, or ones, is less than a certain predetermined threshold value, determine to authenticate the event. Furthermore, it should also be noted that a single shift register may be used in a time-multiplexed manner to alternately provide the closed-loop shift register and the open-loop shift register functionality. This means that a single LFSR implementation may be reused to provide both the closed-loop LFSR and the open-loop LFSR functionality, and thus keep the energy consumption, cost and complexity of the first network entity 121, 131 as low as possible.

It should also be noted that the open-loop LFSR and its logical flip-flops units may be implemented using hardware in the form of electrical circuit components, and/or as a computer program or software running in a microprocessor or similar. In the former case, the open-loop LFSR may be implemented with programmable pins. Also, in some embodiments, the closed-loop shift register and/or the open-loop shift register in the first network entity 121, 131 is a Linear Feedback Shift Register, LFSR.

Action 503

After the authentication of the event in Action 502, the first network entity 121, 131, triggers a change in the closed-loop shift register in order to obtain a subsequent output signal from the closed-loop shift register. This advantageously generates a subsequent output signal, which also may be referred to as a next session key or a subsequent signature, that may be used in the first network entity 121, 131 to authenticate a subsequent event using the subsequent output signal from the closed-loop LFSR when receiving a subsequent event signal from the second network entity 110, 111, 112, 113. It should here be noted that the closed-loop LFSR in the second network entity 110, 111, 112, 113 will correspondingly also be triggered to change upon transmitting the event signal so as to obtain a subsequent output signal to be used for the next event signal transmission. In this manner, the output signal of the closed-loop LFSRs at both the first network entity 121, 131 and the second network entity 110, 111, 112, 113 will continuously and automatically be updated for each transmission session.

Action 504

After the clocking of the closed-loop LFSR in Action 503, the first network entity 121, 131 may store the subsequent output signal from the closed-loop shift register in the first network entity. This enables the first network entity 121, 131 to further authenticate a subsequent event using the stored subsequent output signal from the closed-loop LFSR when receiving a subsequent signal from the second network entity 110, 111, 112, 113 comprising a subsequent event signal. In this case, the second network entity 110, 111, 112, 113 may authenticate a subsequent event using the stored subsequent output signal from the closed-loop shift register when receiving a subsequent signal from the second network entity 110, 111, 112, 113 comprising a subsequent event signal. Hence, the first network entity 121, 131 is able to continuously store the output signal from the closed-loop LFSR for future use upon receiving a subsequent event signal at a later stage.

Action 505

If the event is authenticated in Action 502, the first network entity 121, 131 may trigger the authenticated event in the first network entity 121, 131. For example, if the event for which the event signal may be indicative is whether or not to activate the main circuit of the wireless device from a wake-up receiver circuit in the wireless device, this means that the first network entity 121, 131 may be implemented in the wake-up receiver circuit and transmit an activation signal to the main circuit of the wireless device in order to trigger the wake-up of the main circuit. However, in case the event for which the event signal may be indicative is to authenticate the origin of a signal and/or any type of information payload comprised in a signal, this means that the first network entity 121, 131 may approve the authenticity of the origin of the signal and/or any type of information payload comprised in the signal.

Figure 6:
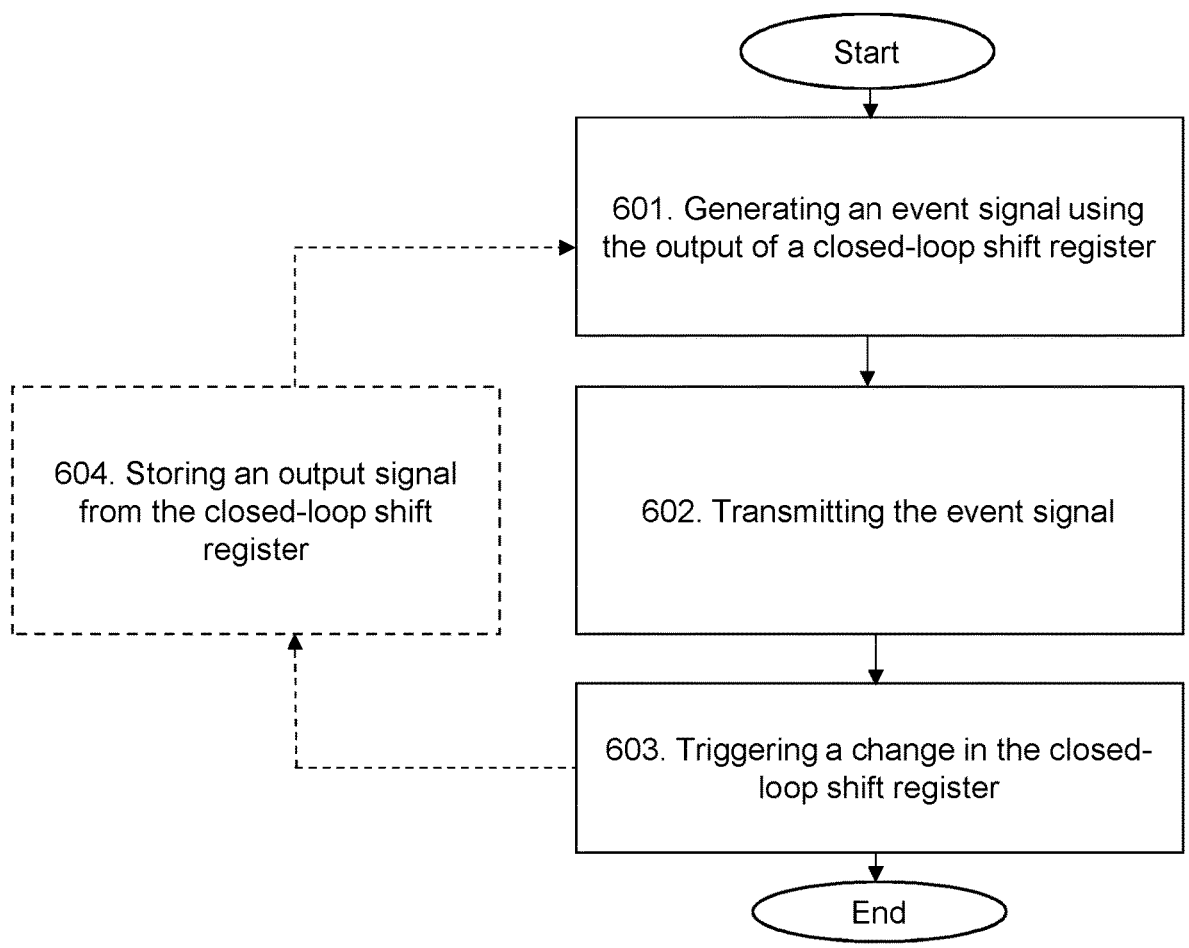
FIG. 6 is a flowchart depicting embodiments of a method in a second network entity.

Example of embodiments of a method performed by a second network entity 110, 111, 112, 113 for authenticating an event in at least one first network entity 121, 131 in a communications network 101, 102, 103, 104 will now be described with reference to the flowchart depicted in FIG. 6. FIG. 6 is an illustrated example of actions or operations which may be taken by the second network entity 110, 111, 112, 113 in the communications network 101, 102, 103, 104.

Action 601

The second network entity 110, 111, 112, 113 generates an event signal to be used in authenticating the event in the at least one first network entity 121, 131 using the output of at least one closed-loop shift register. By generating an event signal using the output of at least one closed-loop LFSR at the second network node 110, 111, 112, 113, an authentication based on this event signal may be performed in the at least one first network node 121, 131 using a corresponding closed-loop LFSR as described above in Actions 501-505. The event signal may be generated in response to determining in the second network entity 110, 111, 112, 113 that an event is to be performed in or by one or more first network entities 121, 131. As described above, the event signal may, for example, be a bit array or sequence, also referred herein as a signature or session key, which indicates to the first network entity 121, 131 that the first network entity 121, 131 is to perform a specific event. The event signal may be transmitted as is, or may form part of another signal transmission, e.g. be included in a dedicated Information Element, IE, in a control channel.

Action 602

After generating the event signal, the second network entity 110, 111, 112, 113 transmit the generated event signal to the at least one first network entity 121, 131. This enables an authentication based on the event signal to be performed in at least one first network node 121, 131 using a corresponding closed-loop LFSR as described above in Actions 501-505. For example, the event signal may be transmitted by the second network node 110, 111, 112, 113 to a large number of first network entities 121, 131 in a communications network in order to cause the large number of first network entities 121, 131 to perform an event, such as, for example, activating a main circuit in each of the first network entities 121, 131 from wake-up receiver circuits receiving the event signal in each of the first network entities 121, 131.

Action 603

The second network entity 110, 111, 112, 113 triggers a change in the at least one closed-loop shift register in order to obtain a subsequent output signal from the at least one closed-loop shift register. This advantageously generates a subsequent output signal, which also may be referred to as a next session key or a subsequent signature, that may be used by the second network entity 110, 111, 112, 113 to authenticate a subsequent event in a subsequent or next event signal transmission to the at least one first network entity 121, 131. It should here be noted that the closed-loop LFSR in the at least one first network entity 121, 131 will correspondingly also be triggered to change upon receiving the event signal so as to also obtain a subsequent output signal to be used for authenticating a subsequent event in a subsequent signal transmission. In this manner, the output signal of the closed-loop LFSRs at both the second network entity 110, 111, 112, 113 and the at least one first network entity 121, 131 will continuously and automatically be updated for each transmission session.

According to some embodiments, the primitive polynomial of the closed-loop shift register in the second network entity 110, 111, 112, 113 may be identical to the primitive polynomial of a corresponding closed-loop shift register in the at least one first network entity 121, 131. This ensures an identical operation of the closed-loop LFSRs at both the transmitting side and receiving side, i.e. at both the second network entity 110, 111, 112, 113, and the first network entity 121, 131. Furthermore, in some embodiments, the initial state of the closed-loop shift register in the second network entity 110, 111, 112, 113 may be identical to the initial state of the corresponding closed-loop shift register in the at least one first network entity 121, 131. This setting advantageously ensures that both closed-loop LFSRs are started with the same starting values, and thus produces an event signal at the second network entity 110, 111, 112, 113 that may be authenticated at the first network entity 121, 131. In some cases, it may happen that the state of the closed-loop LFSR in the second network entity 110, 111, 112, 113 is not identical to the state of the corresponding closed-loop LFSR in the at least one first network entity 121, 131, i.e. a mismatch between the closed-loop LFSRs may occur. This may occur, for example, if there is a long period of time between communication between the second network entity 110, 111, 112, 113 and the first network entity 121, 131, or that one of the closed-loop LFSRs are mistakenly clocked more than once. One way to overcome this and reset the closed-loop LFSRs is to have synchronized timers or clocks at the second network entity 110, 111, 112, 113 and the first network entity 121, 131. This will, however, contribute to the complexity and energy consumption in the first network entity 121, 131 and therefore may not be a suitable solution. Instead, according to some embodiments, the second network entity 110, 111, 112, 113 may, when determining that a first network entity 121, 131 is not responding to the event signal, initiate and perform a discovery procedure to find the correct state or session key. The discovery procedure may comprise the following steps:

1. Defining a secondary closed-loop LFSR in the second network entity 110, 111, 112, 113 having the same configuration as the closed-loop LFSR in the first network entity 121, 131 that is not responding to the event signal;
2. Resetting the secondary closed-loop LFSR with the last successful state or session key;
3. Transmitting the event signal to the first network entity 121, 131;
4. If the first network entity 121, 131 responds, then correct state or session key has been found.
5. If the first network entity 121, 131 does not respond, clock the secondary closed-loop LFSR to generate a new output signal, i.e. a new event signal. Perform step 3 again.

This discovery procedure will advantageously allow a convergence towards the correct state or key in the first network entity 121, 131 because the states or session keys will always be selected from a closed set of keys or session states, which are known from the primitive polynomial and initial state of the closed-loop LFSR.

Also, according to some embodiments, the output signal from the closed-loop shift register may be obtained by the second network entity 110, 111, 112, 113 from the output data, or output data pins, of logical flip-flops units in the closed-loop shift register. Here, it should be noted that the LFSR and its logical flip-flops units may be implemented using hardware in the form of electrical circuit components, and/or as a computer program or software running in a microprocessor or similar. Preferably, the closed-loop LFSR may be implemented with programmable pins.

In some embodiments, the event signal may be configured to generate an all-zero bit sequence when being fed into an open-loop shift register in the at least one first network entity 121, 131 using the output of the closed-loop shift register. This advantageously allows for a more robust solution to be implemented at the at least one first network entity 121, 131 that may tolerate occurrences of errors in the event signal that, for example, may occur due to transmission over a wireless communications network. Also, in some embodiments, the closed-loop shift register and/or the open-loop shift register in the second network entity 110, 111, 112, 113 is a Linear Feedback Shift Register, LFSR.

Action 604

The second network entity 110, 111, 112, 113 may further store the subsequent output signal from the at least one closed-loop shift register in the second network entity 110, 111, 112, 113. This enables the stored subsequent output signal from the at least one closed-loop LFSR to be used by the second network node 110, 111, 112, 113 to generate a subsequent event signal to be used in authenticating a subsequent event in the at least one first network entity 121, 131 at any later point in time. In this case, the second network node 110, 111, 112, 113 may consequently also generate a subsequent event signal to be used in authenticating a subsequent event in the at least one first network entity 121, 131 using the stored subsequent output signal from the at least one closed-loop shift register.

Figure 7:
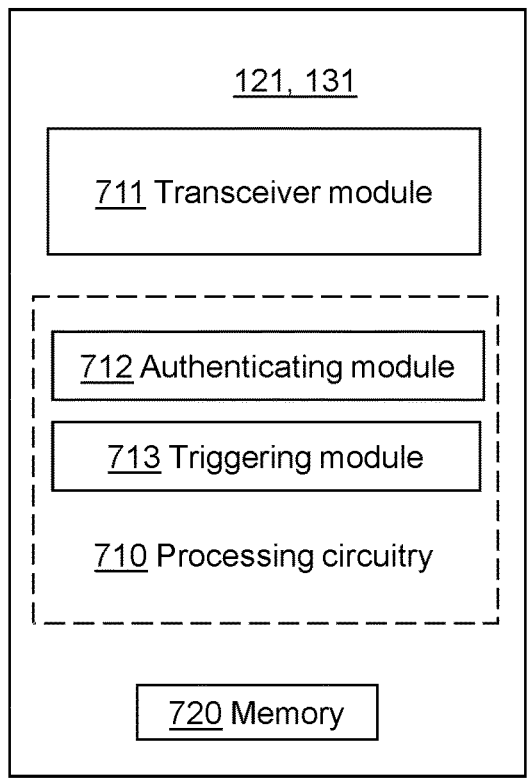
FIG. 7 is a block diagram depicting embodiments of a first network entity.

To perform the method actions in a first network entity 121, 131 for authenticating an event in a communications network 101, 102, 103, 104, the first network entity 121, 131 may comprise the following arrangement depicted in FIG. 7. FIG. 7 shows a schematic block diagram of embodiments of a first network entity 121, 131.

The first network entity 121, 131 may comprise processing circuitry 710 and a memory 720. The first network node 121, 131 may also comprise a transceiver or transceiver module 711. The transceiver module 711 is configured to receive and transmit signals from/to the second network entity 110, 111, 112, 113 in the communications network 101, 102, 103, 104. In some embodiments, the first network entity 121, 131 may comprise network input/output, I/O, ports (not shown) for the signal transmissions. Optionally, in some embodiments, the transceiver module 711 may comprise or be connected to one or more antennas (not shown). In this case, the transceiver module 711 may also comprise Radio Frequency, RF, circuitry and baseband processing circuitry. It should also be noted that some or all of the functionality described in the embodiments above as being performed by the first network entity 121, 131 may be provided by the processing circuitry 710 executing instructions stored on a computer-readable medium, such as, e.g. the memory 720 shown in FIG. 7. Optional embodiments of the first network entity 121, 131 may comprise additional components, such as, for example, a authenticating module 712, and an triggering module 713, each responsible for providing its respective functionality necessary to support the embodiments described herein.

The first network entity 121, 131 or processing circuitry 710 is adapted to, or may comprise the transceiver module 711 adapted to, receive an event signal. Also, first network entity 121, 131 or processing circuitry 710 is adapted to, or may comprise the authenticating module 712 adapted to, authenticate the event if the received event signal correlates with an output signal of a closed-loop shift register in the first network entity 121, 131. Further, the first network entity 121, 131 or processing circuitry 710 is adapted to, or may comprise the triggering module 713 adapted to, trigger a change in the closed-loop shift register in order to obtain a subsequent output signal from the closed-loop shift register.

In some embodiments, the first network entity 121, 131 or processing circuitry 710 may be adapted to store the subsequent output signal from the closed-loop shift register in the first network entity 121, 131, e.g. in the memory 720. In this case, according to some embodiments, the first network entity 121, 131 or processing circuitry 710 may be adapted to, or may comprise the authenticating module 712 adapted to, authenticate a subsequent event using the stored subsequent output signal from the closed-loop shift register when receiving a subsequent signal from the second network entity 110, 111, 112, 113 comprising a subsequent event signal.

In some embodiments, the primitive polynomial of the closed-loop shift register in the first network entity 121, 131 is identical to the primitive polynomial of a corresponding closed-loop shift register in the second network entity 110, 111, 112, 113. Also, in some embodiments, the initial state of the closed-loop shift register in the first network entity 121, 131 is identical to the initial state of the corresponding closed-loop shift register in the second network entity 110, 111, 112, 113. Further, in some embodiments, the output signal from the closed-loop shift register is obtained from the output data, or output data pins, of logical flip-flops units in the closed-loop shift register.

Also, in some embodiments, the received event signal correlates with the output signal of the closed-loop shift register if the received event signal causes a determined output signal when fed into an open-loop shift register that uses the output signal of the closed-loop shift register as its primitive polynomial. Here, according to some embodiments, the determined output signal may be an all-zero bit sequence. In this case, the first network entity 121, 131 may be configured to determine that the received event signal cause the determined output signal in case the number of zeros in the output signal of the open-loop shift register is less than a predetermined threshold. Furthermore, in some embodiments, a single shift register may be used by the first network entity 121, 131 in a time-multiplexed manner to alternately provide the closed-loop shift register and the open-loop shift register functionality. Further, the first network entity 121, 131 or processing circuitry 710 may be adapted to, or may comprise the triggering module 713 adapted to, trigger the authenticated event in the first network entity 121, 131. Also, in some embodiments, the closed-loop shift register and/or the open-loop shift register in the first network entity 121, 131 is a Linear Feedback Shift Register, LFSR.

Furthermore, the embodiments for authenticating an event in a communications network 101, 102, 103, 104 described above may be implemented through one or more processing circuitry, such as, e.g. the processing circuitry 710 in the first network entity 121, 131 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the first network entity 121, 131. The computer program code may e.g. be provided as pure program code in the first network entity 121, 131 or on a server and downloaded to the first network entity 121, 131. Thus, it should be noted that the modules of the first network entity 121, 131 may in some embodiments be implemented as computer programs stored in memory, e.g. in the memory module 720 in FIG. 7, for execution by processing circuitries or processing modules, e.g. the processing circuitry 710 of FIG. 7.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 710 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
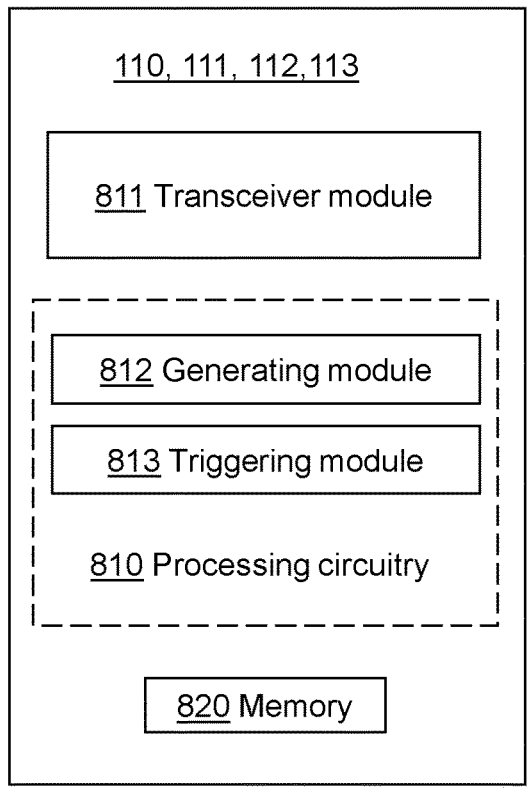
FIG. 8 is a block diagram depicting embodiments of a second network entity.

To perform the method actions in a second network entity 110, 111, 112, 113 for authenticating an event in at least one first network entity 121, 131 in a communications network 101, 102, 103, 104, the second network entity 110, 111, 112, 113 may comprise the following arrangement depicted in FIG. 8. FIG. 8 shows a schematic block diagram of embodiments of a second network entity 110, 111, 112, 113.

The second network entity 110, 111, 112, 113 may comprise processing circuitry 810 and a memory 820. The first network node 121, 131 may also comprise a transceiver or transceiver module 811. The transceiver module 811 is configured to transmit and receive signals to/from the first network entity 121, 131 in the communications network 101, 102, 103, 104. In some embodiments, the second network entity 110, 111, 112, 113 may also comprise network input/output, I/O, ports (not shown) for the signal transmissions. Optionally, in some embodiments, the transceiver module 811 may comprise or be connected to one or more antennas (not shown). In this case, the transceiver module 811 may also comprise Radio Frequency, RF, circuitry and baseband processing circuitry. It should also be noted that some or all of the functionality described in the embodiments above as being performed by the second network entity 110, 111, 112, 113 may be provided by the processing circuitry 810 executing instructions stored on a computer-readable medium, such as, e.g. the memory 820 shown in FIG. 8. Optional embodiments of the second network entity 110, 111, 112, 113 may comprise additional components, such as, for example, a generating module 812, and a triggering module 813, each responsible for providing its respective functionality necessary to support the embodiments described herein.

The second network entity 110, 111, 112, 113 or processing circuitry 810 is adapted to, or may comprise the generating module 812 adapted to, generate an event signal to be used in authenticating the event in the at least one first network entity 121, 131 using the output of at least one closed-loop shift register. Also, second network entity 110, 111, 112, 113 or processing circuitry 810 is adapted to, or may comprise the transceiver module 811 adapted to, transmit the generated event signal to the at least one first network entity 121, 131. Further, the second network entity 110, 111, 112, 113 or processing circuitry 810 is adapted to, or may comprise the triggering module 813 adapted to, trigger a change in the at least one closed-loop shift register in order to obtain a subsequent output signal from the at least one closed-loop shift register.

In some embodiments, the second network entity 110, 111, 112, 113 or processing circuitry 810 may be adapted to store the subsequent output signal from the at least one closed-loop shift register in the second network entity 110, 111, 112, 113, e.g. in the memory 820. In this case, according to some embodiments, the second network entity 110, 111, 112, 113 or processing circuitry 810 may be adapted to, or may comprise the generating module 812 adapted to, generate a subsequent event signal to be used in authenticating a subsequent event in the at least one first network entity 121, 131 using the stored subsequent output signal from the at least one closed-loop shift register.

In some embodiments, the primitive polynomial of the at least one closed-loop shift register in the second network entity 110, 111, 112, 113 is identical to a primitive polynomial of a corresponding closed-loop shift register in the at least one first network entity 121, 131. Also, in some embodiments, the initial state of the at least one closed-loop shift register in the second network entity 110, 111, 112, 113 is identical to an initial state of a corresponding closed-loop shift register in the at least one first network entity 121, 131. Further, in some embodiments, the output signal from the at least one closed-loop shift register is obtained from the output data, or output data pins, of logical flip-flops units in the at least one closed-loop shift register.

Also, in some embodiments, the event signal is configured to generate an all-zero bit sequence when being fed into an open-loop shift register in the at least one first network entity 121, 131. Also, in some embodiments, the closed-loop shift register and/or the open-loop shift register in the second network entity 110, 111, 112, 113 is a Linear Feedback Shift Register, LFSR.

Furthermore, the embodiments for authenticating an event in at least one first network entity 121, 131 in a communications network 101, 102, 103, 104 described above may be implemented through one or more processing circuitry, such as, e.g. the processing circuitry 810 in the second network entity 110, 111, 112, 113 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the second network entity 110, 111, 112, 113. The computer program code may e.g. be provided as pure program code in the second network entity 110, 111, 112, 113 or on a server and downloaded to second network entity 110, 111, 112, 113. Thus, it should be noted that the modules of the second network entity 110, 111, 112, 113 may in some embodiments be implemented as computer programs stored in memory, e.g. in the memory module 820 in FIG. 8, for execution by processing circuitries or processing modules, e.g. the processing circuitry 810 of FIG. 8.

Those skilled in the art will also appreciate that the processing circuitry 810 and the memory 820 described above may refer to a combination of analog and digital circuits, and/or one or more processors configured with software and/or firmware, e.g. stored in a memory, that when executed by the one or more processors such as the processing circuitry 810 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Additional Embodiments

According to some embodiments, the methods describe above may performed in a first network entity 121, such as, e.g. a wireless device, and in a second network entity 110, such as, e.g. a radio base station, in a wireless communications network 101, 102, 103. In this case, one example of an event is the activation of a main circuit in the wireless device, i.e. transmitting an event signal from the radio base station to a wake-up receiver circuit in the wireless device in order to make the wake-up receiver circuit trigger an activation signal to the main circuit in the wireless device, thereby waking up the wireless device. When in the wake up state, the wireless device is able to receive an amount of data or command from the radio base station.

Figure 9:
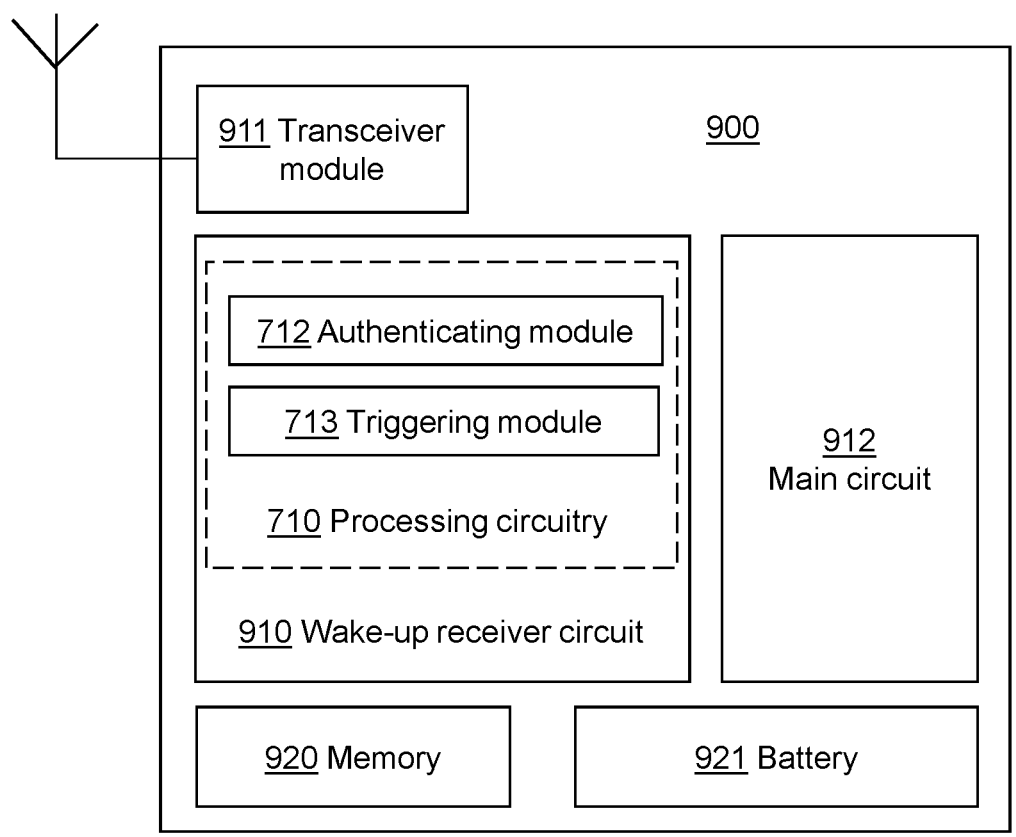
FIG. 9 is a block diagram depicting embodiments of a wake-up receiver circuit in a wireless device.

FIG. 9 is a schematic block diagram of embodiments of a wireless device 900 comprising a wake-up receiver circuit 910 implementing the first network entity 121, 131 as described above. Here, the wake-up receiver circuit 910 may comprise the processing circuitry 710 of the first network entity 121, 131 as described above with reference to FIG. 7, which may also comprise the authentication module 712 and the triggering module 713. In these embodiments, the wake-up receiver circuit 910 and the processing circuitry 710 may use the transceiver module 911 of the wireless device 121 for receiving signals from the radio base station 110, but may also, according to some embodiments, comprise a separate low-power transceiver module (not shown). Furthermore, the wake-up receiver circuit 910 and the processing circuitry 710 may also use the memory 920 of the wireless device 121. The wireless device 121 further comprises a main circuit 912 and a battery 921. The main circuit 912 may comprise each circuit in the wireless device 121 other than the wake-up receiver circuit 910. This particular use case and embodiments will now be described below in more detail.

Wireless communications networks over the licensed spectrum today mainly work in a client-server manner in order to provide a better control over the radio resource usage in the network. However, this client-server connectivity mode is also used in many ad-hoc sensor networks over the unlicensed spectrum. In this client-server connectivity mode, the client, normally the wireless device, needs to listen to the control channel continuously to be in touch with the server, normally the radio base station, for any upcoming data packets. For example, in WiFi networks and cellular networks, notifications about any queued data packet at the radio base station is sent to the wireless device as soon as it becomes available. However, as continuous listening to the control channel will deplete the battery of the wireless device in a relatively short time many energy-saving features have been developed to reduce the energy consumption in receiving the control signals.

One existing energy-saving scheme is to put the wireless device in a sleeping mode and to wake it up periodically to check if data packets are available for reception. As a consequence, this scheme, commonly referred to as a timer-based wake-up scheme, introduces a delay in the communications within the network. This delay depends on the length of the sleeping mode. This sleeping period could be either short-and-light, such as, e.g. one or multiple Transmission Time Intervals, TTIs, in one LTE frame, or long-and-deep, e.g. tens of minutes in a NB-IoT network. However, the wireless device ultimately needs to check the control channel at regular time intervals, which makes long-term activity, such as years, based on typical batteries impossible.

To resolve this problem, wake-up receivers have been proposed. Wake-up receivers typically receives a control signal comprising a signature in order to activate the wireless device in which it is implemented. Also, a wake-up receiver continuously decode the received control signals, and checks if the received signature, i.e. decoded payload, is consistent with its own signature. The received signature or decoded payload is usually an On-Off Keying, OOK, modulated signal which comprise a special signature dedicated to a specific wireless device. Using wake-up receivers, the main circuit of a wireless device could, for example, be put into a sleep mode as long as needed. Since the main circuit of the wireless device is kept switched off and only the wake-up receiver is switched on, which will consume less energy, a higher battery lifetime in the wireless device is achievable in comparison to, for example, wireless devices using a timer-based wake-up scheme.

However, a major energy consumer in a wake-up receiver is a comparator circuit. This component is responsible for comparing the received signature and the stored signature of the wireless device. Some examples of comparator circuits for comparing the received signature and the stored signature of the wireless device comprise using a per-node designed comparator circuit, or a signature matcher microcontroller. In the former example, a bitwise check of decoded signal with the stored signature is performed using a tree of ANDs or XORs electrical components.

Furthermore, while wake-up receivers today enable energy-efficient communications to a certain extent, they also include some drawbacks. For example, one drawback is that existing wake-up receivers are not secure and may be exposed to battery lifetime attacks. This means that an eavesdropper may listen to the control channel, discover the pattern used in activating the wireless device, and activate the wireless device repetitively in order to deplete the battery of the wireless device. Some examples of providing a more secure wake-up receiver are described in U.S. patent application Ser. No. 15/336,033 (Yang, Yunsong, et al., "System and Method for Secure and Quick Wake Up of a Station.") and U.S. Pat. No. 9,955,333 (Benoit, Olivier Jean, Stephen Jay Shellhammer, and Rahul Malik, "Secure wireless wake-up companion"). However, these proposed solutions mandate extra message exchanges between the wireless devices and the radio base stations, and hence are not energy efficient. Therefore, there is a need for a secure yet energy-efficient wake-up receiver without any need for extra message exchanges for confirmation of the received signature.

Such a wake-up receiver is provided by the wake-up receiver circuit 910 described in FIG. 9 implementing the first network entity 121, 131. The wake-up receiver circuit 910 described in FIG. 9 may, according to some embodiments, be configured to authenticate an event if a received event signal correlates with an output signal of a closed-loop LFSR wherein the received event signal correlates with the output signal of the closed-loop LFSR if the received event signal causes a determined output signal when fed into an open-loop LFSR that uses the output signal of the closed-loop LFSR as its primitive polynomial. These embodiments are described further below with reference to FIGS. 10-12.

Figure 10:
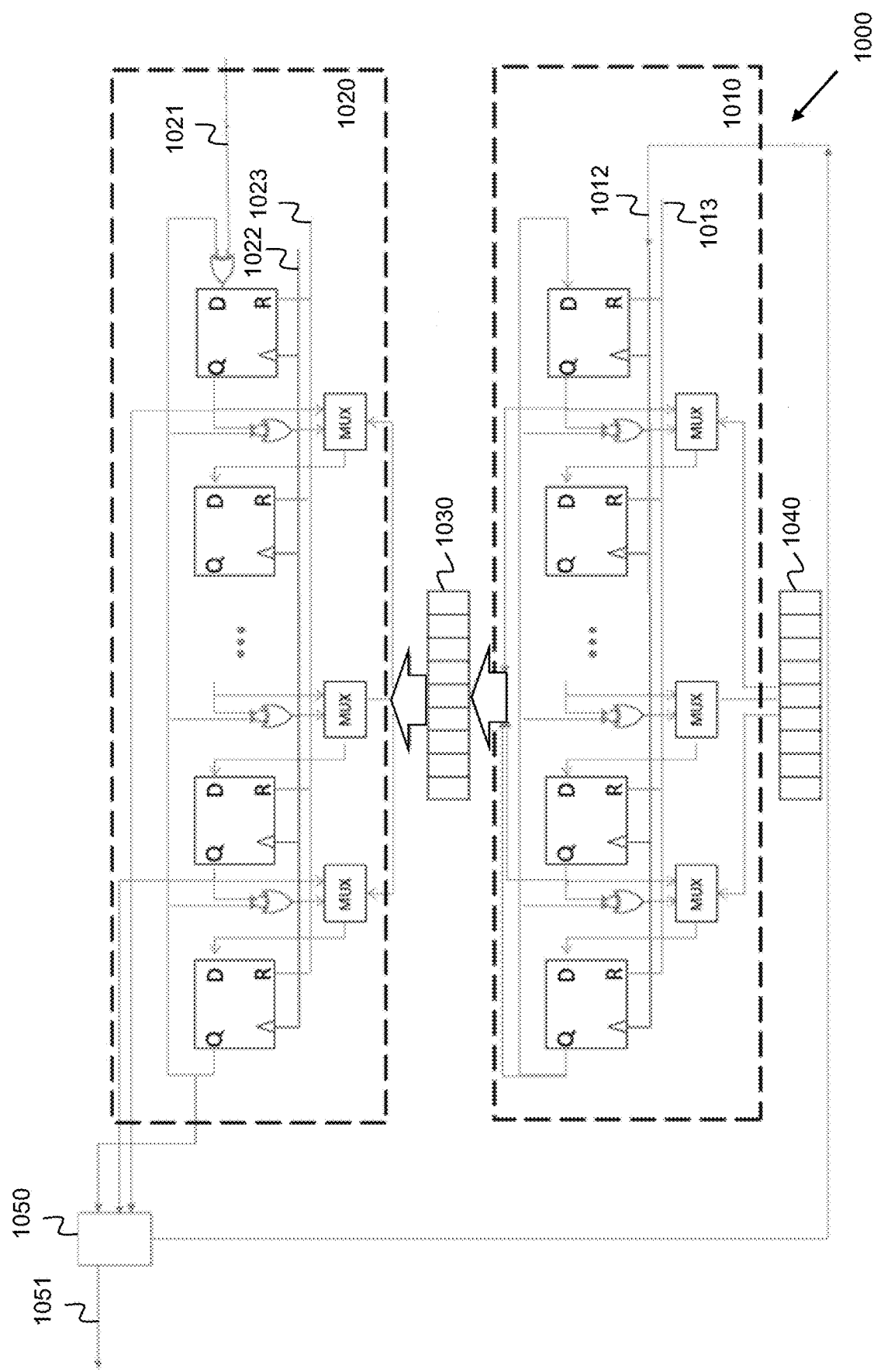
FIG. 10 is a schematic illustration of the operation of a wake-up receiver circuit according to some embodiments.

FIG. 10 is a schematic illustration of an example operation of the wake-up receiver circuit 910 in the wireless device 900. The wake-up receiver circuit 910 may be implemented as a comparator circuit 1000 comprising a closed-loop LFSR 1010 and an open-loop LFSR 1020. The closed-loop LFSR 1010 and open-loop LFSR 1030 may, for example, be LFSRs with programmable pins. Memory data 1040 comprising the primitive polynomial of the closed-loop LFSR 1010, which is identical to the primitive polynomial of a corresponding closed-loop LFSR at a radio base station, may be used by the closed-loop LFSR 1010 for generating a signature. This is performed by the closed-loop LFSR when being clocked by a clock signal 1012. The closed-loop LFSR 1010, and the corresponding closed-loop LFSR at the radio base station, may both be clocked at the start or the end of each communication session. For example, upon transmitting an event signal from the radio base station and upon receiving the event signal in the wireless device. The output signal of the closed-loop LFSR 1010, i.e. the signature, may be stored as memory data 1030. The signature stored in the memory data 1030 may then be used as the primitive polynomial of the open-loop LFSR 1020.

The open-loop LFSR 1020 is thus able to authenticate a received event signal by comparing the decoded payload of the event signal 1021 with the primitive polynomial of the open-loop LFSR 1020, i.e. the stored signature from the closed-loop LFSR 1010 in the memory data 1030. When clocked by a clock signal 1022, the open-loop LFSR 1020 may compare the decoded payload of the event signal 1021 with the primitive polynomial of the open-loop LFSR 1020 by XOR-ing the bit stream of the decoded payload with the feedback from the output of the flip-flops in the open-loop LFSR 1020.

Here, it should also be noted that time multiplexing of a single LFSR may be used to provide both the signature generation of the closed-loop LFSR 1010 and the comparison of the open-loop LFSR 1020. This means a single LFSR may be re-used for in order to keep the energy consumption and complexity of the wireless device 900 as low as possible. By using a single LFSR and leveraging time-multiplexing, the cost and energy consumption will be further lowered.

By implementing a specific primitive polynomial, the output signal of the open-loop LFSR 1020 based on this specific primitive polynomial will be a bit stream of all zeros only in response to a unique specific input sequence. Thus, by having the specific primitive polynomial generated by closed-loop LFSRs in both the wireless device and the radio base station, the radio base station is able to provide an event signal for which the output signal of the open-loop LFSR 1020 is all zeros. In other words, the primitive polynomial of the open-loop LFSR 1020 may act as a session key, which is changed by the closed-loop LFSR 1010 at the start or end of each communication session. In this case, if the output signal of the open-loop LFSR is all zeros, then the received event signal is authenticated.

Hence, for example, a logic circuit 1050 in the wake-up circuit 910 may, in response to the authenticated event signal, send an activation signal 1051 to a main circuit of the wireless device 900 which will trigger the wireless device 900 to wake up. The logic circuit 1050 may also control the clock signals 1012 of the closed-loop LFSR 1010 and the clock signals 1022 of the open-loop LFSR 1020. Furthermore, the logic circuit 1050 may reset the flip-flops of the closed-loop LFSR 1010 using a reset signal 1013, and reset the flip-flops of the open-loop LFSR 1020 using a reset signal 1023, when necessary.

Here, it should also be noted that this example also enables an error tolerance for the event signal to be implemented, which may be particularly advantageous in wireless communications networks. More precisely, while the output signal of the open-loop LFSR 1020 should be all zero, or, in some embodiments, all ones, in order for the wake-up receiver 910 to send an activation signal which triggers wireless device 900 to wake up, the logic circuit 1050 may check the number of zeros, or ones, in the output signal of open-loop LFSR 1010. Then, if the number of zeros, or ones, is less than a predetermined threshold value, then the wake-up receiver 910 will send an activation signal which triggers wireless device 900 to wake up. In other words, the comparator circuit 1000 may be configured to tolerate having an n-bit mismatch between decoded payload of the event signal and the stored signature from the closed-loop LFSR 1010, wherein n may be predetermined or configured in the wake-up receiver 910.

Figure 11:
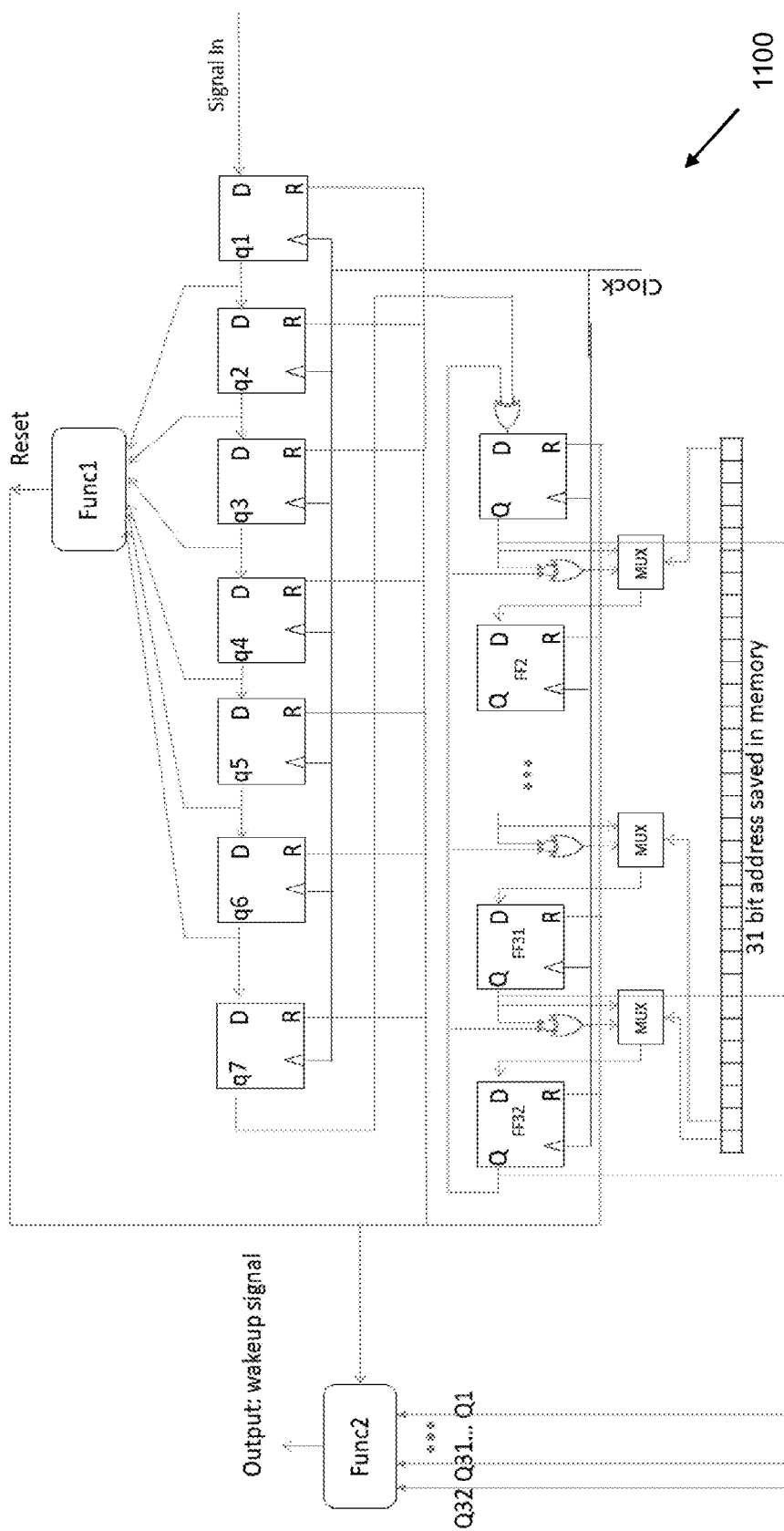
FIG. 11 is another schematic illustration of the operation of a wake-up receiver circuit according to some embodiments, FIG. 12 illustrate example functions of the wake-up receiver circuit in FIG. 11 according to some embodiments.
Figure 12:
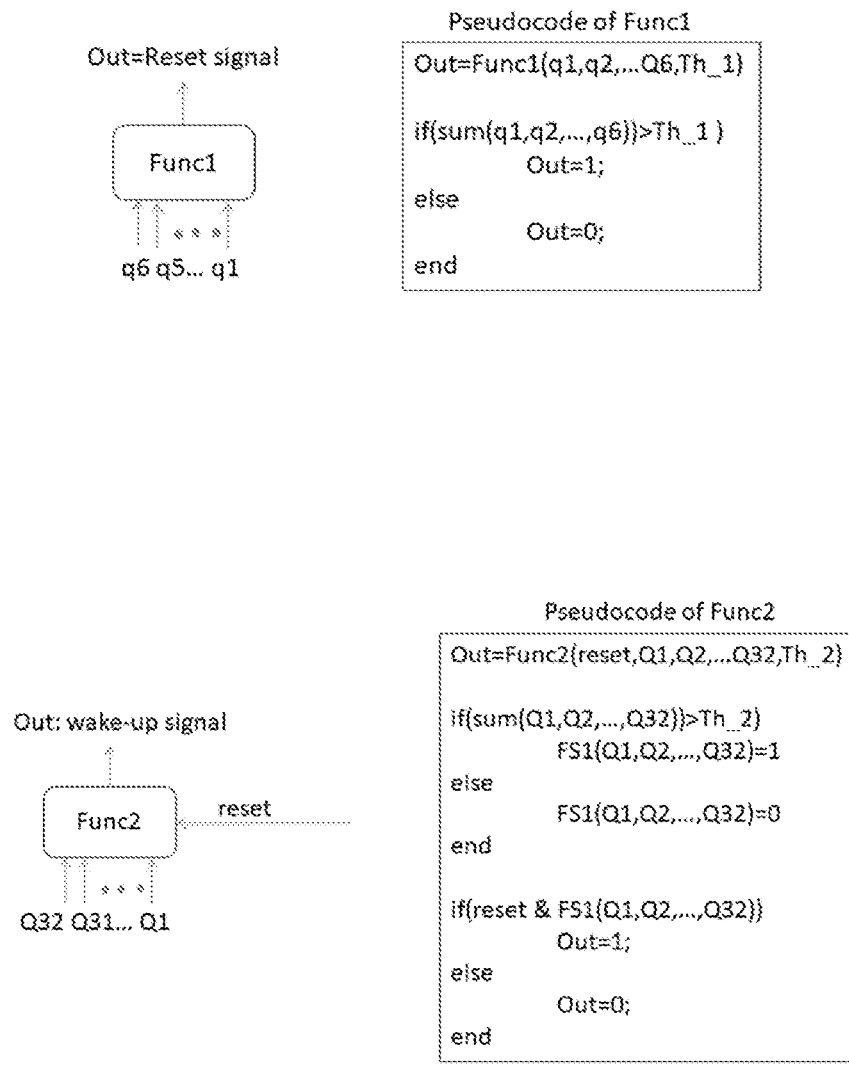

FIGS. 11-12 are schematic illustrations of another example operation of the wake-up receiver circuit 910 in the wireless device 900. The wake-up receiver circuit 910 may be implemented as a comparator circuit 1100 comprising a closed-loop LFSR and an open-loop LFSR in the same manner as shown in FIG. 10. The comparator circuit 1100 utilizes one 32-bit LFSR and a 6-bit reset function. From FIGS. 11-12, it may be seen that the comparator circuit 1100 is reset after receiving 6 consecutive ones, and that addressing of wireless devices is performed using 31-bit binary numbers.

The comparator circuit 1100 has been used for testing the energy efficiency of the embodiments described herein. The energy consumption results using Design Compiler of Synopsis with the UMC65 library is shown in Table 1 below:

| Frequency | 1 kHz | 10 kHz | 100 kHz | 1 MHz |
| --- | --- | --- | --- | --- |
| Dynamic Power Consumption | 167 pW | 1.67 nW | 16.7 nW | 167 nW |
| Static Power Consumption | 874 pW | 874 pW | 874 pW | 874 pW |

From Table 1, it may be seen that the total energy consumption of the comparator circuit 1100 in 1 kHz frequency of operation is 1.041 nW (nano Watts), i.e. both dynamic and static power consumption. Comparing these results with other comparator circuits, it has been noted that the power consumption of such other comparator circuits for a 16-bit signature may approximately be around 12 ρW (micro Watts). In this respect, it may be seen that the embodiments described herein are also highly energy efficient when it comes to actual power consumption.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage wireless devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

LFSR Linear Feedback Shift Register
DRX Discontinuous reception
CRC Cyclic redundancy check
OOK On-Off Keying

The invention claimed is:

1. A method performed by a first network entity for authenticating an event in a communications network, the method comprising
receiving an event signal, wherein the event signal comprises a signal that indicates whether to activate a circuit of the first network entity;
authenticating the event responsive to determining that the received event signal correlates with an output signal of a closed-loop shift register in the first network entity;
performing the event in response to the event being authenticated; and
triggering a change in the closed-loop shift register in order to obtain a subsequent output signal from the closed-loop shift register;
wherein the received event signal correlates with the output signal of the closed-loop shift register responsive to determining that the received event signal causes a determined output signal when the received event signal is fed into an open-loop shift register that uses the output signal of the closed-loop shift register as its primitive polynomial; and
wherein a single shift register is used in a time-multiplexed manner to alternately provide a functionality of the closed-loop shift register and a functionality of the open-loop shift register.

2. A first network entity for authenticating an event in a communications network the first network entity comprising a processing circuitry being configured to
receive an event signal, wherein the event signal comprises a signal that indicates whether to activate a circuit of the first network entity,
authenticate the event responsive to determining that the received event signal correlates with an output signal of a closed-loop shift register in the first network entity,
perform the event in response to the event being authenticated; and
trigger a change in the closed-loop shift register in order to obtain a subsequent output signal from the closed-loop shift register;
wherein the received event signal correlates with the output signal of the closed-loop shift register responsive to a determination that the received event signal causes a determined output signal when the received event signal is fed into an open-loop shift register that uses the output signal of the closed-loop shift register as its primitive polynomial; and
wherein a single shift register is used in a time-multiplexed manner to alternately provide a functionality of the closed-loop shift register and a functionality of the open-loop shift register.

3. The first network entity according to claim 2, wherein the processing circuitry is further configured to
store the subsequent output signal from the closed-loop shift register in the first network entity, and
authenticate a subsequent event using the stored subsequent output signal from the closed-loop shift register when receiving a subsequent signal from a second network entity comprising a subsequent event signal.

4. The first network entity according to claim 2, wherein a primitive polynomial of the closed-loop shift register in the first network entity is identical to a primitive polynomial of a corresponding closed-loop shift register in a second network entity.

5. The first network entity according to claim 4, wherein an initial state of the closed-loop shift register in the first network entity is identical to an initial state of the corresponding closed-loop shift register in the second network entity.

6. The first network entity according to claim 2, wherein the output signal from the closed-loop shift register is obtained from an output data, or output data pins, of logical flip-flops units in the closed-loop shift register.

7. The first network entity according to claim 2, wherein the determined output signal is an all-zero bit sequence, and wherein the first network entity is configured to determine that the received event signal cause the determined output signal in case a number of zeros in an output signal of the open-loop shift register is less than a predetermined threshold.

8. The first network entity according to claim 2, wherein the processing circuitry is further configured to trigger the authenticated event in the first network entity.

9. The first network entity according to claim 2, wherein the closed-loop shift register and/or the open-loop shift register is a Linear Feedback Shift Register, LFSR.

10. The first network entity according to claim 2, wherein the processing circuitry comprises at least one processing circuitry and a memory, wherein the memory is containing instructions executable by the at least one processing circuitry.

11. A method performed by a second network entity for authenticating an event in at least one first network entity in a communications network, the method comprising
generating an event signal to be used in authenticating the event in the at least one first network entity using output of at least one closed-loop shift register, wherein the event signal comprises a signal that indicates whether to activate a circuit of the at least one first network entity, wherein the event signal is generated in response to determining that the event is to be performed by the at least one first network entity;

transmitting the generated event signal to the at least one first network entity; and triggering a change in the at least one closed-loop shift register in order to obtain a subsequent output signal from the at least one closed-loop shift register;

wherein the event signal correlates with an output signal of the at least one closed-loop shift register responsive to the event signal being determined to cause an output signal when the event signal is fed into an open-loop shift register that uses the output signal of the at least one closed-loop shift register as its primitive polynomial; and wherein a single shift register is used in a time-multiplexed manner to alternately provide a functionality of the at least one closed-loop shift register and a functionality of the open-loop shift register.

12. A second network entity for authenticating an event in at least one first network entity in a communications network, the second network entity comprising a processing circuitry being configured to generate an event signal to be used in authenticating the event in the at least one first network entity using output of at least one closed-loop shift register, wherein the event signal comprises a signal that indicates whether to activate a circuit of the at least one first network entity, wherein the event signal is generated in response to a determination that the event is to be performed by the at least one first network entity, transmit the generated event signal to the at least one first network entity, and trigger a change in the at least one closed-loop shift register in order to obtain a subsequent output signal from the at least one closed-loop shift register;

wherein the event signal correlates with an output signal of the at least one closed-loop shift register responsive to the event signal being determined to cause an output signal when the event signal is fed into an open-loop shift register that uses the output signal of the at least one closed-loop shift register as its primitive polynomial; and wherein a single shift register is used in a time-multiplexed manner to alternately provide a functionality of the at least one closed-loop shift register and a functionality of the open-loop shift register.

13. The second network entity according to claim 12, wherein the processing circuitry is further configured to store the subsequent output signal from the at least one closed-loop shift register in the second network entity, and generate a subsequent event signal to be used in authenticating a subsequent event in the at least one first network entity using the stored subsequent output signal from the at least one closed-loop shift register.

14. The second network entity according to claim 12, wherein a primitive polynomial of the at least one closed-loop shift register in the second network entity is identical to a primitive polynomial of a corresponding closed-loop shift register in the at least one first network entity.

15. The second network entity according to claim 14, wherein an initial state of the at least one closed-loop shift register in the second network entity is identical to an initial state of a corresponding closed-loop shift register in the at least one first network entity.

16. The second network entity according to claim 12, wherein the subsequent output signal from the at least one closed-loop shift register is obtained from the output, or output data pins, of logical flip-flops units in the at least one closed-loop shift register.

17. The second network entity according to claim 12, wherein the event signal is configured to generate an all-zero bit sequence when the event signal is being fed into an open-loop shift register in the at least one first network entity.

18. The second network entity according to claim 12, wherein the processing circuitry comprises at least one processing circuitry and a memory, wherein the memory is containing instructions executable by the at least one processing circuitry.

* * * * *